UNITED STATES PATENT OFFICE.

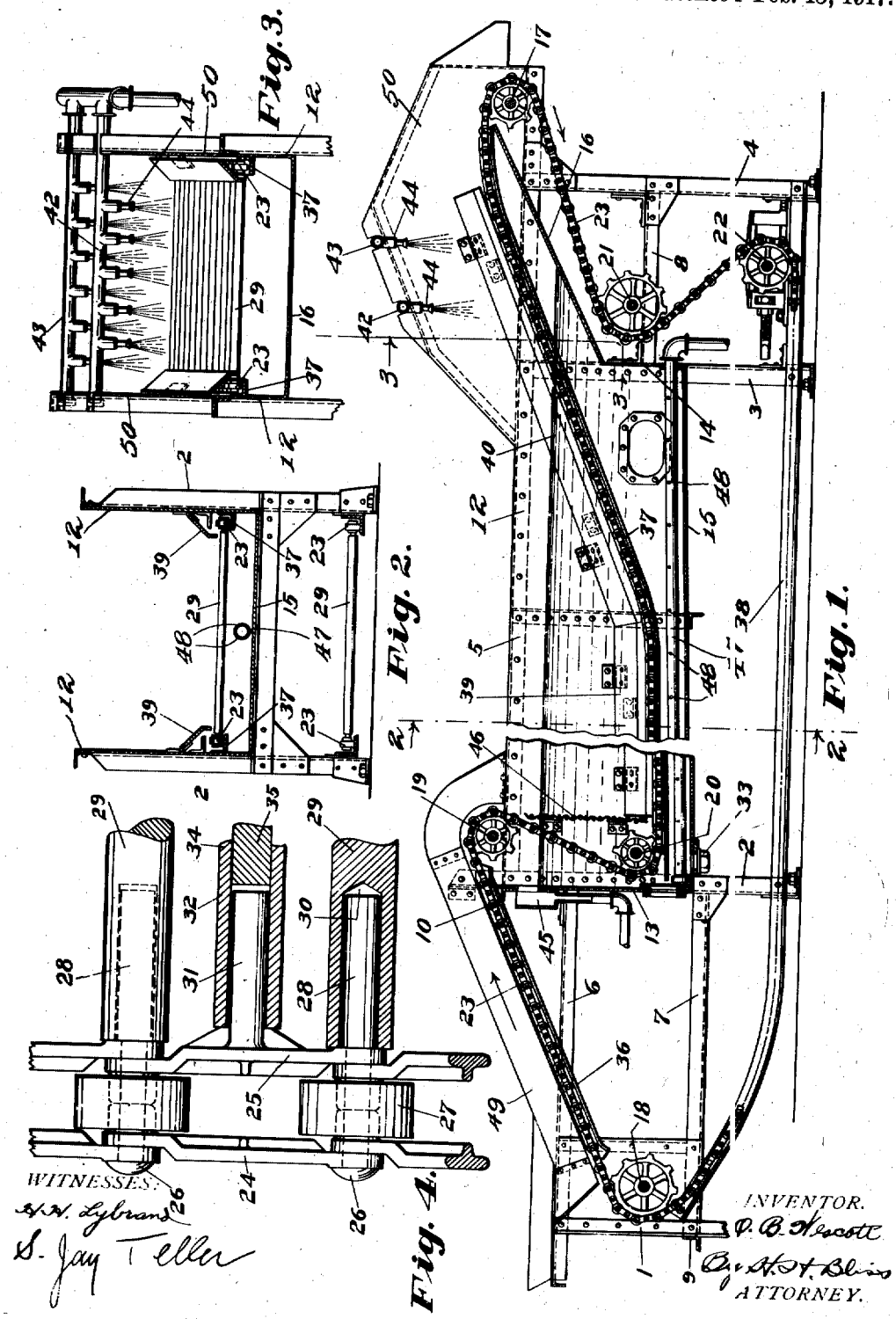

OTIS B. WESCOTT, OF COLUMBUS, OHIO, ASSIGNOR TO THE JEFFREY MANUFACTURING COMPANY, OF COLUMBUS, OHIO, A CORPORATION OF OHIO.

FRUIT-WASHER.

1,215,596.  Specification of Letters Patent.  Patented Feb. 13, 1917.

Application filed June 24, 1914.  Serial No. 847,021.

*To all whom it may concern:*

Be it known that I, OTIS B. WESTCOTT, a citizen of the United States, residing at Columbus, in the county of Franklin and State of Ohio, have invented certain new and useful Improvements in Fruit-Washers, of which the following is a specification, reference being had therein to the accompanying drawing.

This invention relates to certain new and useful improvements in mechanisms for washing fruit and vegetables, particularly tomatoes, preparatory to canning.

One object of the invention is to provide in a tomato washer of this class, conveying elements for carrying the fruit through the machine, which will automatically clear itself of grass or other similar material associated with the unwashed tomatoes.

Another object is to provide means for violently agitating the wash water, to effectually cleanse the fruit without bruising or otherwise injuring it.

Another object is to provide means to thoroughly rinse the fruit as it emerges from the wash water, and to drain it before delivery from the machine.

These and other objects are attained by the devices set forth in the following specification, and illustrated in the accompanying drawings, of which, Figure 1 is a longitudinal sectional view of the machine.

Fig. 2 is a cross section of the machine taken on the line 2—2 of Fig. 1.

Fig. 3 is a cross section of the machine taken on the line 3—3 of Fig. 1.

Fig. 4 is a detail of the conveyer chain and flights.

Like numerals refer to similar parts in the several figures.

This washer comprises a carrying conveyer of peculiar construction, upon which the tomatoes or other fruit to be washed are carried through the washer tank, where all foreign matter is loosened by the violent agitation of the wash water, thence under the rinsing spray, where the loosened matter is washed off to be floated away to the overflow and discharged over the head shaft into any convenient receptacle ready for use.

The supporting structure comprises the vertical angle bars 1, 2, 3, and 4, secured to any suitable foundation, to which are attached the longitudinal members 5, 6, 7 and 8, and suitable cross members such as 9 and 10. Supported on this frame work is a tank composed of the side plates 12, the end plates 13 and 14, the bottom plate 15 and the draining plate 16, all joined together in any manner suitable to tank construction.

Mounted on this structure, in suitable journal bearings, are the head shaft 17, the foot shaft 18 and the corner shafts 19, 20, 21 and 22, all of which are provided with suitable sprocket wheels over which travel the conveyer chains 23. The conveyer can vary as to details but it should have an open material supporting structure for the purpose to be set forth. As shown, the conveyer chains 23 are of a well known construction, composed of cast metal side bars 24 and 25, joined by pintles 26 and supplied with rollers 27 adapted to travel over suitable trackage. The pintles 26 have extensions 28 upon which are mounted the conveyer flights 29. These conveyer flights are formed of round bars into the ends of which are drilled apertures 30 which engage the pintle extensions 28 to form pivotal supports on which the flights are free to rotate. Formed at the middle of the inner side bars 25 are studs 31, similar in form and dimensions to the pintle extensions 28, upon which are mounted intermediate flights 32. In Fig. 4, at 32 I have illustrated an alternative construction for the flights, which consists of sections of pipe, or tubing 34, into which have been inserted fillings 35 of any convenient material, such as wooden cores, or plaster of Paris filling, which prevent the accumulation of vegetable matter in the interior of the flights. Such accumulations, if allowed, would soon become putrid and contaminate the fruit which was being washed. The movements of the flights on the pintle extensions is sufficient to keep such accumulations out of the apertures in the ends of the flights.

A considerable amount of grass and of fragments of vines is commonly associated with the unwashed fruit, which if allowed to become entangled with the conveyer chains or flights would soon choke the machine. By the above described construction the flights present no corners on which such material may become entangled, and by their rotation the flights are able to free themselves from such material which works through the conveyer to the bottom of the tank to be washed out of the washout plug 33.

Guide angles 36 support the chains 23 at the receiving end, guide angles 37 lead the chains through the tank and to the discharge point and guide angles 38 support the return strands. The shaft 22 is provided with suitable take up journal boxes by which the tension of the chains 23 may be adjusted.

Shields 39 and 40, hinged to the side plates 12, protect the tomatoes from contact with the chains. The hinge mounting of the shields permits them to be raised from time to time for the removal of trash which may accumulate beneath them.

Supported on the frame work of the washer, above the drainage plate 16, are manifold pipe fittings 42 and 43 into which are fitted a plurality of spray nozzles 44 through which the rinse water is discharged upon the fruit as it is carried from the washing tank to the discharge point. An overflow outlet 45 is provided in the plate 13 through which the excess water and the floating refuse is discharged, to maintain a uniform depth of pure water in the tank. As the water flows from the drainage plate 16 to this outlet 45 there will be sufficient current formed to float off the lighter particles of refuse, the heavier matter falling through between the flights of the conveyer to be washed out through the washout plug 33 at the close of the day's work. A shield, composed of wire mesh, 46, guards the fruit from contact with the shaft 20 and the sprocket wheels thereon.

Lying along the center line of the bottom of the tank is a pipe 47 connected with a supply of compressed air, and provided with numerous orifices 48 through which jets of air flow into the wash water. As the bubbles of air rise in the water they pass through between the flights of the conveyer, violently agitating the water without causing any injury to the tomatoes upon the conveyer.

To insure a safe delivery to the washer and a safe discharge therefrom of the tomatoes there are provided the guards 49, at the feeding end of the machine, and 50 at the discharge end, these guards serving to confine the tomatoes to the conveyer.

Power is supplied to the shaft 21 which by means of the sprocket wheels causes the conveyer to move in the direction of the arrow. The tomatoes, or other fruit to be washed, are fed onto the conveyer at the front end, and are carried up to, and dropped over, the shaft 19, into the washing medium, the said washing medium being in a state of constant and violent agitation as a result of up-drafts of compressed air fed from the pipe 47. The tomatoes slowly settle to the conveyer, and while settling are washed by the agitated water, the heavier particles of the dirt settling to the bottom of the tank while the lighter particles float off through the overflow 45. As the tomatoes settle upon the conveyer they are carried up the second incline and immediately after leaving the wash are given a final rinsing by means of the streams of water coming from the spray nozzles 44 attached to the manifolds 42 and 43. At the end of the conveyer they are deposited into whatever receptacle may be provided to receive them. The constant streams of water coming from the spray nozzles 44 also serve to keep the wash water comparatively fresh.

The fruit or vegetables can be supplied to the tank in relatively large quantities rapidly. The articles form an indiscriminate mass resting upon the conveyer, each being sufficiently free to be moved, it being relatively lightened by the suspending action of the water; and the jets of air which are forced through the conveyer agitate the water and turn the articles so as to expedite the cleansing. The conveyer bars being easily rotatable are caused by the material resting upon them to turn around their axes, this movement taking to the chamber below them the foreign materials (dirt, sand, stems, pieces of vine, etc.) so that they are self-cleaned.

What I claim is:

1. In a fruit-washing machine, the combination with the tank for wash water, of means for supporting the articles and while supporting them conveying them continuously in one direction, said means comprising a conveyer section arranged to receive the articles at the bottom of the body of water and at one end of the vessel and convey them in horizontal paths along said bottom, a second conveyer section arranged to take the articles from the last aforesaid section and carry them upward on inclined lines to points above the surface of the water, and a conveyer section at the receiving end of the apparatus which is positioned above the water in the tank and arranged to initially receive the articles and deliver them to the tank.

2. In a fruit washing machine, the combination of a tank for containing wash water, and a continuous endless flight conveyer having an initial fruit receiving section positioned above the level of the water in the tank and a second fruit receiving section in the tank below the end of the first section and moving in the same direction, the fruit being discharged from the first section into the water and settling through the water onto the second section, and a guard screen in the tank for holding the fruit away from the part of the conveyer between the aforesaid sections.

3. In a fruit-washing machine, the combination of a tank for wash water and an endless conveyer traveling continuously around an orbit on supports which establish three operative sections of said conveyer, the first section being positioned to receive the articles outside of the water and carry them to points above its surface, the second section being positioned approximately horizontally along the bottom of the water tank, and the third section extending from the bottom of the tank to points above the level of the water, the discharge end of the first section and the receiving end of the second section being arranged substantially as set forth to cause the articles delivered from the first section to escape from the conveyer at the receiving end of the tank and to settle through the water to the receiving end of the second conveyer section and then to be continuously supported by the second and third sections and thereby carried through and out from the water.

4. In a fruit washing machine, the combination of a tank for containing wash water, and an endless conveyer having an upwardly inclined receiving section with its delivery end above the level of the water, a second section at the bottom of the water, an intermediate idle section inclined away from the path of the dropping material, and a third section for elevating the material from the bottom of the tank to points above the water, that portion of the conveyer submerged in the water being adapted to hold indiscriminately a mass of the articles to be washed.

In testimony whereof, I affix my signature, in presence of two witnesses.

OTIS B. WESCOTT.

Witnesses:
P. W. WILLEY
DUDLEY T. FISHER.